US010760915B2

(12) United States Patent
Cannizzaro et al.

(10) Patent No.: US 10,760,915 B2
(45) Date of Patent: Sep. 1, 2020

(54) SYNCHRONIZING NODES AT A MEETING POINT

(71) Applicant: INTERNATIONAL BUSINESS MACHINES CORPORATION, Armonk, NY (US)

(72) Inventors: Giovanna Cannizzaro, Rome (IT); Patrizia Manganelli, Pomezia (IT); Elisa Matteagi, Rome (IT); Alessandro Raniolo, Rome (IT)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 15/471,365

(22) Filed: Mar. 28, 2017

(65) Prior Publication Data

US 2018/0283884 A1     Oct. 4, 2018

(51) Int. Cl.
    *G01C 21/34*      (2006.01)
    *G06Q 10/10*      (2012.01)

(52) U.S. Cl.
    CPC ..... *G01C 21/3438* (2013.01); *G01C 21/3453* (2013.01); *G06Q 10/1095* (2013.01)

(58) Field of Classification Search
None
See application file for complete search history.

(56) References Cited

U.S. PATENT DOCUMENTS

| | | | |
|---|---|---|---|
| 6,678,613 B2 | 1/2004 | Andrews et al. | |
| 8,165,792 B2* | 4/2012 | Mikan | G01C 21/3438 701/465 |
| 8,249,626 B2 | 8/2012 | Huston | |
| 8,606,517 B1* | 12/2013 | Ehrlacher | G08G 1/096811 701/117 |
| 2002/0128850 A1 | 9/2002 | Chen et al. | |

(Continued)

FOREIGN PATENT DOCUMENTS

CA     2738600 C     5/2016

OTHER PUBLICATIONS

Mell et al., "The NIST Definition of Cloud Computing," National Institute of Standards and Technology, Sep. 2011, p. 1-3, Special Publication 800-145.

(Continued)

*Primary Examiner* — David P. Merlino
(74) *Attorney, Agent, or Firm* — Robert C. Bunker

(57) ABSTRACT

A method, computer system, and a computer program product for synchronizing a plurality of nodes is provided. The present invention may include receiving a synchronization request from a first node. The present invention may include sending an invitee request to a second node. The present invention may then include receiving node data and constraints. The present invention may include generating valid actions based on the node data and the constraints. The present invention may include determining a projected arrival time for each node based on the node data. The present invention may include determining a late node based on the projected arrival time of the late node exceeding a threshold time. The present invention may include determining a corrective action associated with the late node based on the projected arrival time and the valid actions. The present invention may include sending the corrective action to the late node.

17 Claims, 5 Drawing Sheets

(56) References Cited

U.S. PATENT DOCUMENTS

| | | |
|---|---|---|
| 2005/0114014 A1 | 5/2005 | Isaac |
| 2005/0283308 A1 | 12/2005 | Szabo et al. |
| 2006/0227047 A1 | 10/2006 | Rosenberg |
| 2008/0167937 A1* | 7/2008 | Coughlin ............... G01C 21/20 705/7.16 |
| 2009/0017803 A1 | 1/2009 | Brillhart et al. |
| 2009/0164236 A1 | 6/2009 | Gounares et al. |
| 2011/0172905 A1 | 7/2011 | Schröder et al. |
| 2012/0203833 A1* | 8/2012 | Faulbacher ........ G06Q 10/1095 709/204 |
| 2014/0229099 A1 | 8/2014 | Garrett et al. |
| 2015/0213414 A1 | 7/2015 | Zuckerman et al. |
| 2015/0285643 A1* | 10/2015 | Tucker ................... G06Q 50/01 701/519 |
| 2016/0148167 A1* | 5/2016 | Li ......................... G06Q 10/10 705/7.19 |
| 2016/0232625 A1* | 8/2016 | Akutagawa ........... H04L 65/403 |
| 2018/0197153 A1* | 7/2018 | Busch ................ G06Q 10/1095 |

OTHER PUBLICATIONS

Schaal et al., "Best Time and Content for Delay Notification," Proceedings of the Eighth International Symposium on Temporal Representation and Reasoning, 2001, p. 75-80, IEEE.

* cited by examiner

SYNCHRONIZING NODES AT A MEETING POINT

BACKGROUND

The present invention relates generally to the field of computing, and more particularly to dynamic navigation.

Coordinating two or more persons to meet at a common time and place has been a challenge throughout history. Today, with smartphones and other mobile devices capable of real-time communication, the challenge has decreased to a degree.

SUMMARY

Embodiments of the present invention disclose a method, computer system, and a computer program product for synchronizing a plurality of nodes. The present invention may include receiving a synchronization request from a first node within the plurality of nodes. The present invention may also include sending an invitee request to a second node within the plurality of nodes. The present invention may then include receiving a plurality of node data and a plurality of constraints from the plurality of nodes. The present invention may further include generating a plurality of valid actions based on the received plurality of node data and the received plurality of constraints. The present invention may also include determining a projected arrival time for each node within the plurality of nodes based on the received plurality of node data. The present invention may then include determining at least one late node based on the projected arrival time of at least one late node within the plurality of nodes exceeding a threshold acceptable time range. The present invention may further include determining a corrective action associated with the determined at least one late node based on the projected arrival time and the generated plurality of valid actions. The present invention may also include sending the determined corrective action to the determined at least one late node including, in case of an unexpected blocking situation that may produce an abnormal delay of one node, replacing the node with another node initially suggested as a backup to the node.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
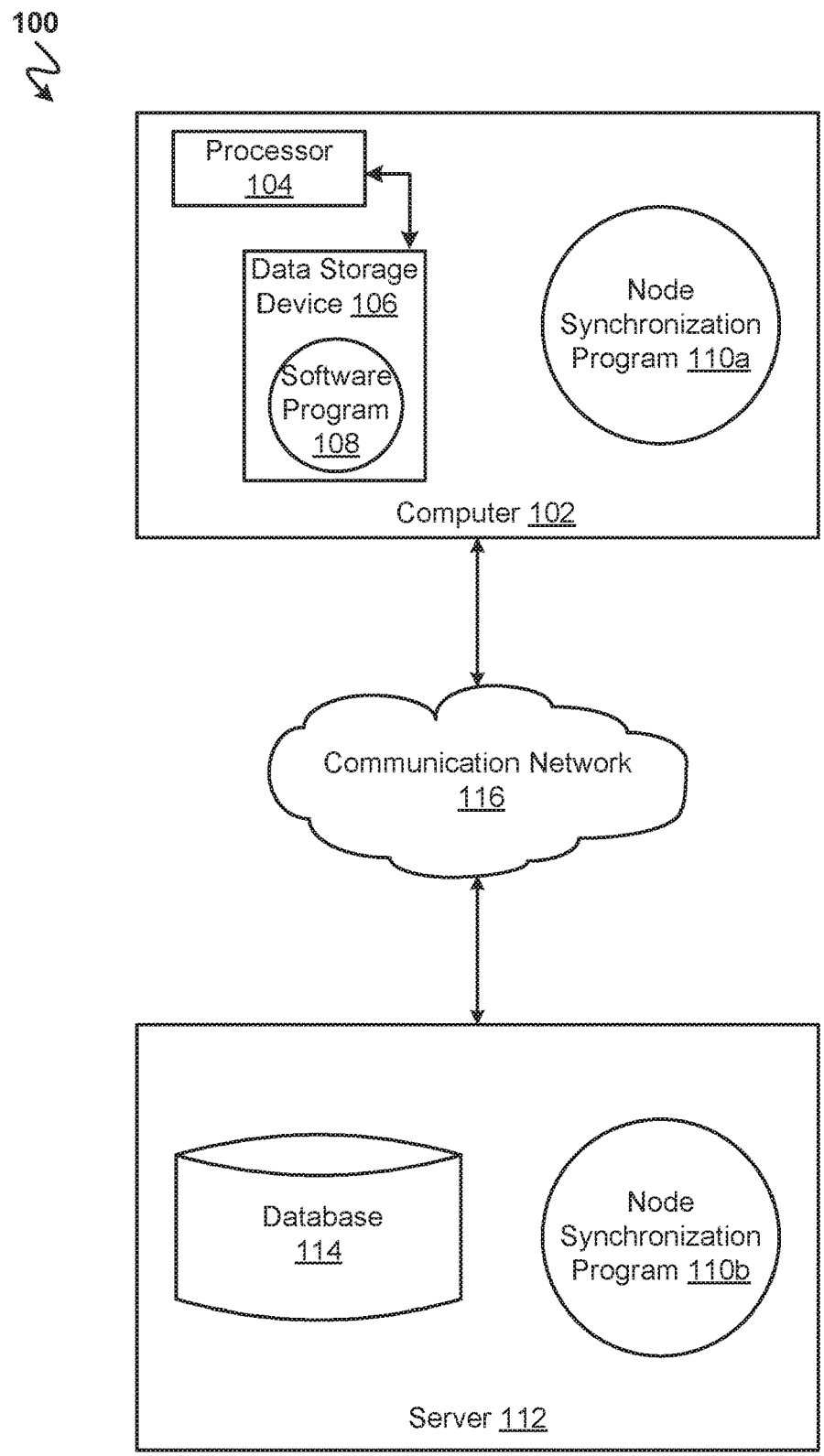
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described previously, coordinating two or more persons to meet at a common time and place has been a problem throughout history. Today, with smartphones and other mobile devices capable of real-time communication, the problem has lessened to a degree. Even with modern technology to aid people in meeting, often times one person will arrive at a meeting place and will have to wait until another person arrives. Notifications may be sent to the parties to let the parties know when a person will arrive relative to another, however, at least one person will still have to wait.

Therefore, it may be advantageous to, among other things, provide a way to dynamically alter suggested travel routes for people in real-time to minimize the wait time any person may experience at a meeting point.

The following described exemplary embodiments provide a system, method and program product for synchronizing nodes at a meeting point. As such, the present embodiment has the capacity to improve the technical field of dynamic navigation by analyzing current data and constraints of nodes and then determining route alterations to one or more nodes in order to synchronize when the nodes arrive at a meeting point. More specifically, a central system may receive a synchronization request from a node. Thereafter, the other nodes associated with the synchronization may be determined and have requests sent. Thereafter, data and constraints may be received from the nodes and then a list of valid actions that may be taken by the nodes may be created. If the projected arrival times of the nodes are not close to the meeting time, then valid actions may be determined for one or more nodes to take to make the projected arrival times for the nodes be closer to the meeting time. Then, if the current time is not close to the meeting time, another iteration may complete by collecting data and constraints, listing valid actions, and suggesting actions to the nodes as needed.

According to at least one embodiment, a control system is provided for two or more persons to subscribe to in order to meet each other at the same time, or close to the same time, at a geographic location designated as the meeting point. The control system may guide the people involved to reduce the minimum waiting time of each person at the meeting point. The control system may leverage the availability of mobile devices integrated with global positioning systems (GPS) and service providers that may communicate traffic data, statuses of trains, flight arrivals, and so on. Periodically or in response to an event, the control system may evaluate the information transmitted by the people involved in the synchronization indicating current position and constraints (e.g., currently travelling by plane) and then identify a set of valid actions that the persons who are less constrained may take to adapt to have a projected arrival time that may be closer to the meeting time. The set of valid actions may, for example, include making a stop at a tourist site, changing travel speed, and changing travel route.

More specifically, the control system receives information from two or more nodes and determines at time intervals how to synchronize the nodes. Nodes may be mobile devices carried by persons and identified by the cell phone number corresponding with the mobile device that communicates with the control system. To begin, a synchronization request may be issued by one of the nodes to the control system specifying a meeting time and place and the other persons involved in the meeting. The system then sends the request to the other invitees and may receive data and notifications from each node. In response to certain events or at predefined time intervals, the nodes may transmit information to the control system and the control system may then analyze the received node information to determine available actions that may be taken and project a time of arrival at the meeting place. Information from the nodes may include data and constraints.

A constraint may include a node limitation that has an associated constraint weight. The constraints and associated constraint weights may be analyzed to identify the nodes that have travel routes that should be altered. For example, at a specific time, a node may be a mobile device carried by a person travelling in a car and another node may be a mobile device carried by a passenger on an airplane. For the person travelling by airplane, there may be no valid actions available to alter travel, and therefore the weight of the constraints associated with the airplane traveler may be greater than the constraints of the car traveler. Hence, the car traveler's route may be altered instead of the airplane traveler. Data may include information that describes the status of the node at a given period of time. For example, data may include GPS coordinates, a flight identifier, speed and direction of movement, projected arrival time, and the route from the current position of the node to the meeting place.

In an example scenario with two nodes, the adaptation of one or both nodes may result in a change of travel route, a speed reduction, a stop during travelling, or an alert that the meeting time has changed. Some alterations may be applied automatically by the node or control system. For instance, travel navigation software may automatically update a travel route or an electronic control unit within a car or other vehicle may be instructed to lower a speed limiter or alter cruise control.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a node synchronization program 110a. The networked computer environment 100 may also include a server 112 that is enabled to run a node synchronization program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device or node, a telephone, a personal digital assistant, a netbook, a laptop computer, a tablet computer, a desktop computer, or any type of computing devices capable of running a program, accessing a network, and accessing a database 114. According to various implementations of the present embodiment, the node synchronization program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the node synchronization program 110a, 110b (respectively) to dynamically alter travel behavior or suggest alterations to travel behavior for one or more nodes to minimize wait time for nodes meeting at a destination at a predefined time. The node synchronization method is explained in more detail below with respect to FIG. 2.

Figure 2:
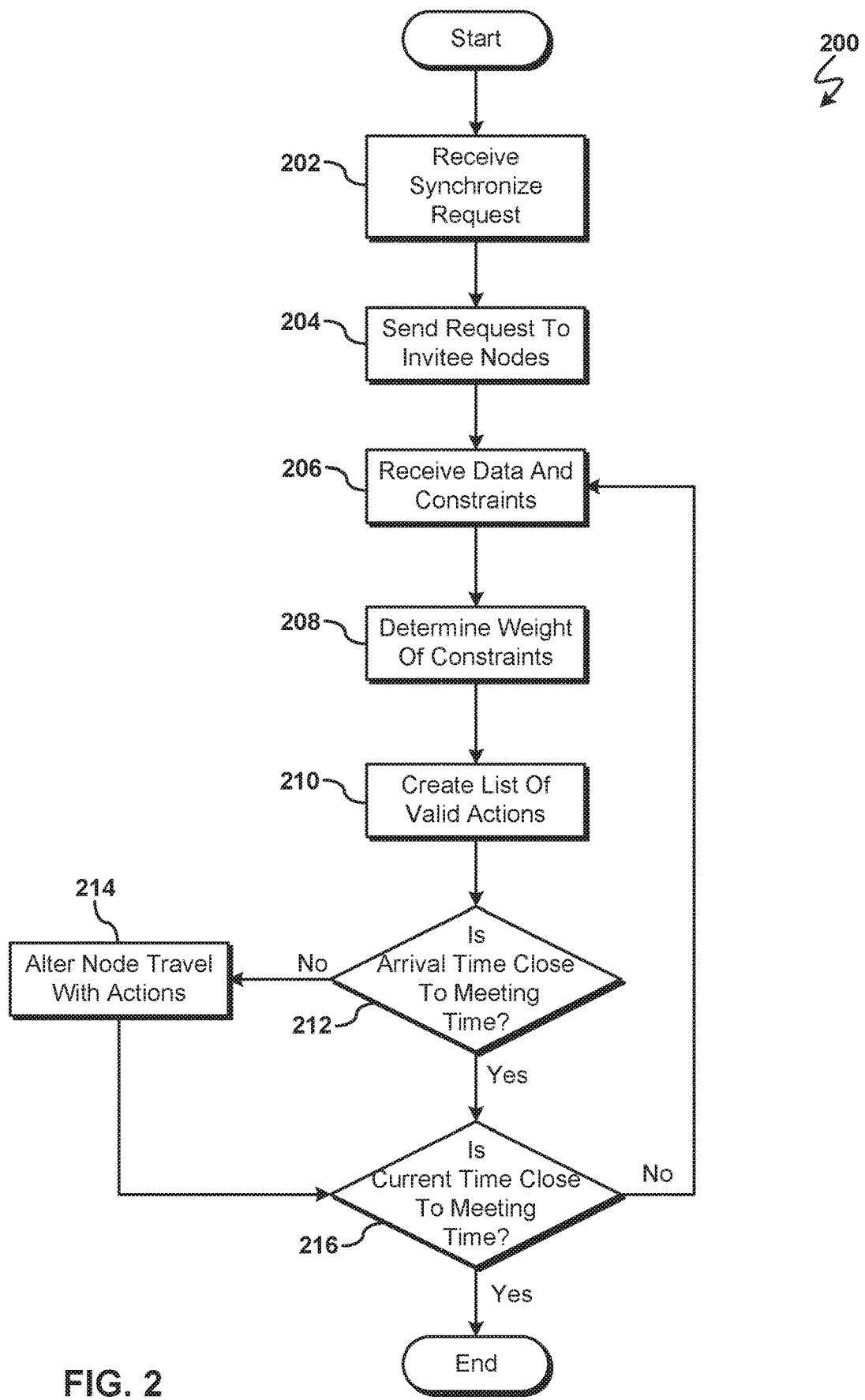
FIG. 2 is an operational flowchart illustrating a process for node synchronization according to at least one embodiment.

Referring now to FIG. 2, an operational flowchart illustrating the exemplary node synchronization process 200 used by the node synchronization program 110a and 110b (i.e., control system) according to at least one embodiment is depicted.

At 202 the control system receives a synchronization request from a node or mobile device. The request may be generated, for example, by a standalone application running on the node or as an additional feature in a calendar application. A user of the mobile device node may be presented with graphical user interface (GUI) elements, such as on screen buttons and text boxes, to input a geographical meeting location and meeting time as well as indicate the other parties meeting at the same location and time. After the user inputs the aforementioned meeting information, a request message may be generated containing the meeting information and then the request message may be transmitted over a communication network 116 from the node to the control system. For example, node A may generate a synchronization request for a meeting at 5:00 p.m. at the city park with node B and node C. The synchronization request may include the meeting time value of 5:00 p.m., the meeting location value of the city park and corresponding coordinates, and the cell phone numbers of node B and node C. Node A may then send the synchronization request to the control system.

Next, at 204, the control system sends an invitee request to the invitee nodes. The received request may be analyzed to extract participant node identifiers. Participant nodes may be identified, for example, by a cell phone number. Thereafter, the control system may generate invitee requests for each invitee node identified in the received synchronization request. The invitee request may include the meeting location, meeting time, and the other parties (i.e., nodes) to the meeting. Continuing the previous example, from the synchronization request, an invitee request for node B may be generated having the meeting time value of 5:00 p.m., the meeting location value of the city park and corresponding coordinates, the cell phone number of node A and the cell phone number of node C. A second invitee request for node C may be generated having the meeting time value of 5:00 p.m., the meeting location value of the city park and corresponding coordinates, the cell phone number of node A and the cell phone number of node B.

Then, at 206, node data and constraints are received from the nodes associated with the synchronization request. Once the invitee nodes receive the invitee requests, the invitee nodes and original requesting node may begin to transmit node data and constraints to the control system via one or more communication networks 116. Node data may include information that describes the status of the node at a given period of time. For example, node data may include GPS coordinates, a flight identifier, speed and direction of node movement, projected arrival time, and the route from the current position of the node to the meeting place. A constraint may include a node limitation. Node limitations may include information indicating that the person associated with the node is, for example, currently travelling by airplane and thus may have constraints preventing route changes and speed changes.

At 208 weights are determined for the received node constraints. As described previously, certain constraints may make travel route alterations difficult or impossible. To determine which nodes should receive route alteration suggestions, the constraints associated with each node may be weighted. Thus, the node with constraints having the least weight, may receive suggestions to alter the travel route of the node instead of nodes with constraints with a greater weight. For example, at a specific time, a node may be a mobile device carried by a person travelling in a car and another node may be a mobile device carried by a passenger on an airplane. For the person travelling by airplane, there may be no valid actions available to alter travel, and therefore the weight of the constraints associated with the airplane traveler may be greater than the constraints of the car traveler. Hence, the car traveler's route may be altered instead of the airplane traveler based on the weight of the constraints.

Next, at 210, a list of valid actions is created. A list of available valid actions may be created based on the one or more nodes that have lower constraint weights. Valid actions may be determined based on the previously received constraints. A data repository, such as a database 114, may contain predefined available valid actions mapped to constraints. More specifically, the database 114 may be queried to retrieve the predefined valid actions for a given constraint. For example, for a person traveling by car, valid actions may include changing speed, making a stop, and a route change. In another example, valid actions for a person traveling by subway may include making a stop and a route change. Finally, for a person traveling by airplane, no valid actions may be available. Furthermore, valid actions may be modified based on node data, such as a location or time, to limit certain actions to be safer for a person or to comply with local laws. For example, for a person traveling by car, a route change may not be allowed as a valid action during evening hours at the person's location since an alternate route may be more dangerous at night.

Then, at 212, the control system determines if the projected arrival time of the nodes are close to the meeting time. The projected arrival time for each node may be determined by the node and be a part of the node data transmitted to the control system as described previously at 206. Alternatively, the control system may determine a projected arrival time based on the node data using known algorithms utilizing mode of travel, travel route, speed, stops, and so on. Once the projected arrival times are calculated for each node, the projected arrival times may be compared to the meeting time to determine the difference between the projected arrival times and the meeting time. A threshold acceptable time range may be specific to indicate when a projected arrival time is sufficiently close to the meeting time. For example, a static value of five minutes may be considered a threshold acceptable time range, whereby if the nodes have a projected arrival time within five minutes of the meeting time, the projected arrival time of the nodes will be determined to be close to the meeting time. According to at least one other embodiment, the threshold acceptable time range may be dynamic and determined based on the particular synchronization scenario. For example, the threshold acceptable time range may be larger if more nodes are involved or if a high percentage of the nodes have a high number of constraints and fewer available actions.

If the control system determined that the arrival time of one or more nodes is not close to the meeting time at 212, then node travel routes are altered with corrective actions at 214. Based on the comparison of projected arrival times to the meeting time performed previously at 212, one or more nodes are identified that have projected arrival times that are outside the threshold acceptable time range, for example, nodes may be identified as being late nodes. The identified nodes and associated list of available actions for each node may be analyzed to determine a corrective action or a combination of corrective actions that may be added to the node travel route to alter the projected arrival time to be closer to the meeting time (i.e., within the threshold acceptable time range). For example, if nodes A, B, and C are parties to the meeting and node A is projected to arrive at the meeting point ten minutes before the meeting time, then the list of available actions associated with node A is searched for a corrective action that may be taken to slow node A by ten minutes. If node A is traveling by car, the list of available actions may include reducing car speed. After calculating the speed change needed to slow node A by ten minutes, the alteration to node A's travel route may be to suggest to the user associated with node A to change the node's speed to equal the calculated speed change.

Alterations to travel routes may be sent from the control system to the node via the communication network 116 to prompt the user with a notification to perform the suggested corrective action, such as make a ten minute stop. Alternatively, the control system may interact with electronic devices to implement the corrective actions transparently to the user. For example, the control system may direct a car to lower a speed limiter to alter the node's travel speed or the control system may instruct a navigation system to provide an altered travel route for the user to follow.

According to at least one other embodiment, if the node constraints prevent the alteration of travel routes to arrive at the meeting place at the original meeting time, a new meeting time may be determined that allows all nodes to arrive within the threshold acceptable time range. For example, node A and node B may have originally planned to meet at 5:00 p.m. If node A is travelling by plane and is projected to arrive at the meeting place at 6:00 p.m. and node B is travelling by car and is projected to arrive at the meeting place at 5:00 p.m., then, due to constraints, node A will not be able to alter travel plans to reach the meeting place at 5:00 p.m., however, node B has fewer constraints and altering node B's travel route could allow node A and node B to meet at the meeting place at 6:00 p.m. Thus, node B's travel route may be altered and node A and node B may be notified that the meeting time has changed to 6:00 p.m.

If the control system determined that the projected arrival times of the nodes is close to the meeting time at 212 or if the node travel routes were altered with actions at 214, then the control system determines if the current time is close to the meeting time at 216. The control system may retrieve the current time and then compare the current time to the meeting time. Another threshold acceptable time range may be used to determine if the current time is sufficiently close to the meeting time. If the threshold acceptable time range is 20 minutes, the meeting time is 5:00 p.m., and the current time is 4:47 p.m., then the control system will determine that the current time is close to the meeting time.

If the control system determined that the current time is close to the meeting time at 216, then there may not be sufficient time to implement corrective actions and route alterations to better synchronize the nodes and the synchronization process 200 ends. However, if the control system determined that the current time is not close to the meeting time at 216, then the control system will return to 206 to collect updated data and constraints from the nodes.

It may be appreciated that FIG. 2 provides only an illustration of one embodiment and does not imply any limitations with regard to how different embodiments may be implemented. Many modifications to the depicted embodiment(s) may be made based on design and implementation requirements. For example, a different mode of travel may be determined and suggested for a node if one or more of the nodes is blocked. For instance, if a person associated with a node is traveling by bus and there is a delay that prevents the bus from moving at an acceptable rate, then alternate modes of travel may be determined and the control system may suggest the person use a taxi or rent a car. According to at least one other embodiment, a new person and associated node may be swapped in place of a node if the constraints do not allow for meeting at the location and the appointed time. According to yet another embodiment, if one node is delayed, some other activities may be determined and suggested for the one or more nodes that are not delayed, such as determining local tourist sites that may interest a person based on the person's social media profile.

Figure 3:
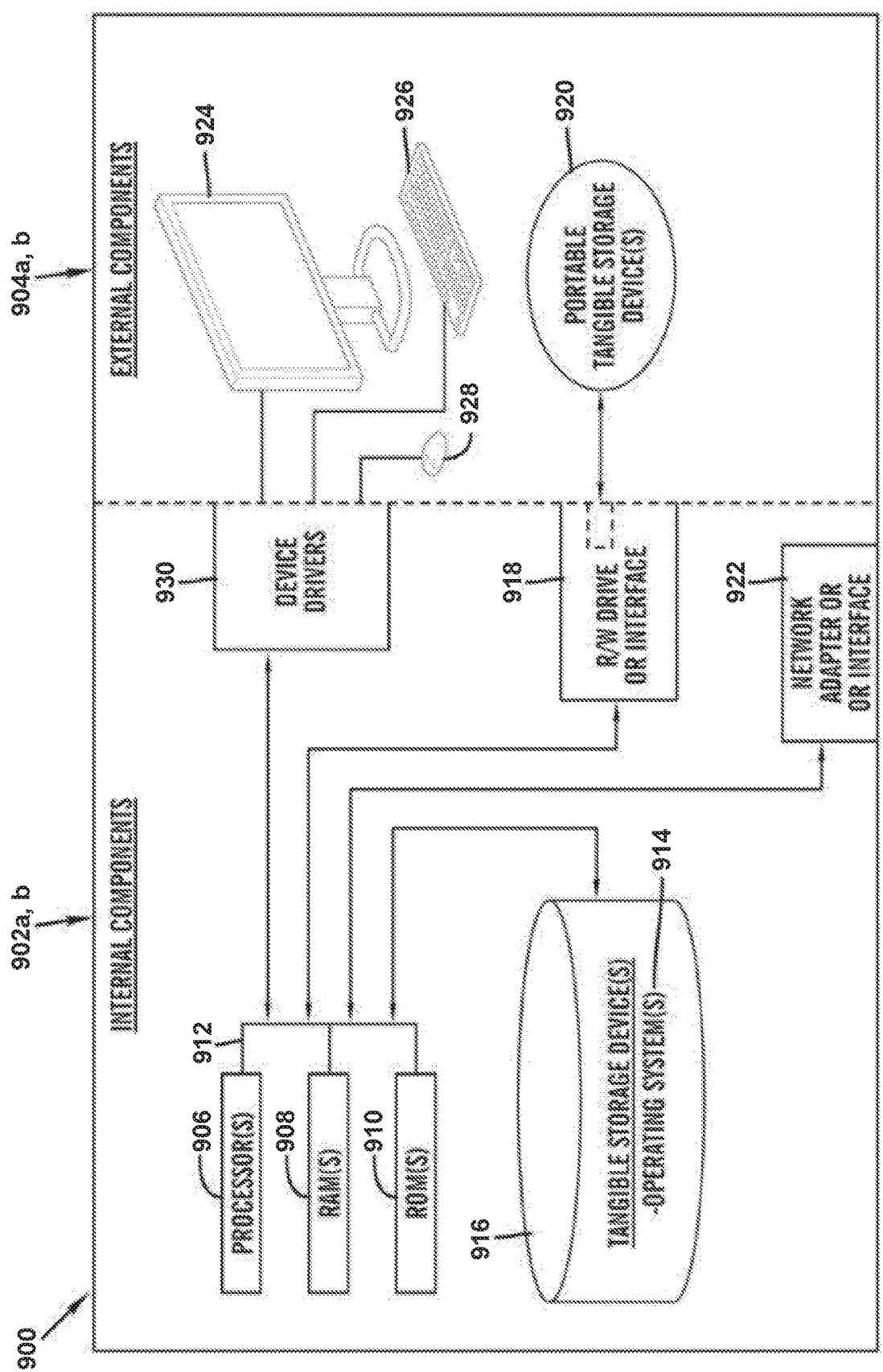
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the node synchronization program 110a in client computer 102, and the node synchronization program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the node synchronization program 110a and 110b can be stored on one or more of the respective portable computer-readable tangible storage devices 920, read via the respective R/W drive or interface 918, and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the node synchronization program 110a in client computer 102 and the node synchronization program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the node synchronization program 110a in client computer 102 and the node synchronization program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
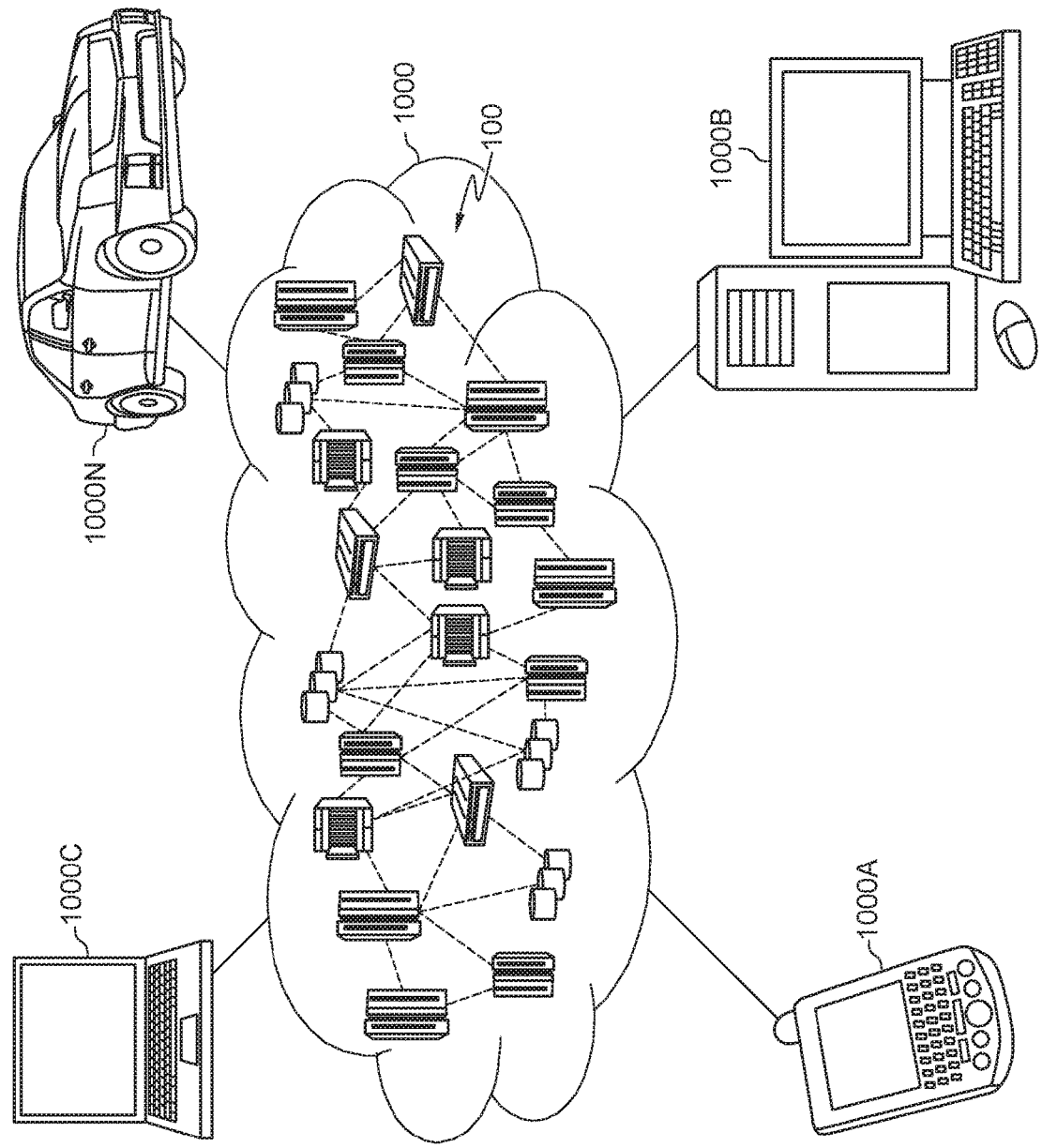
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
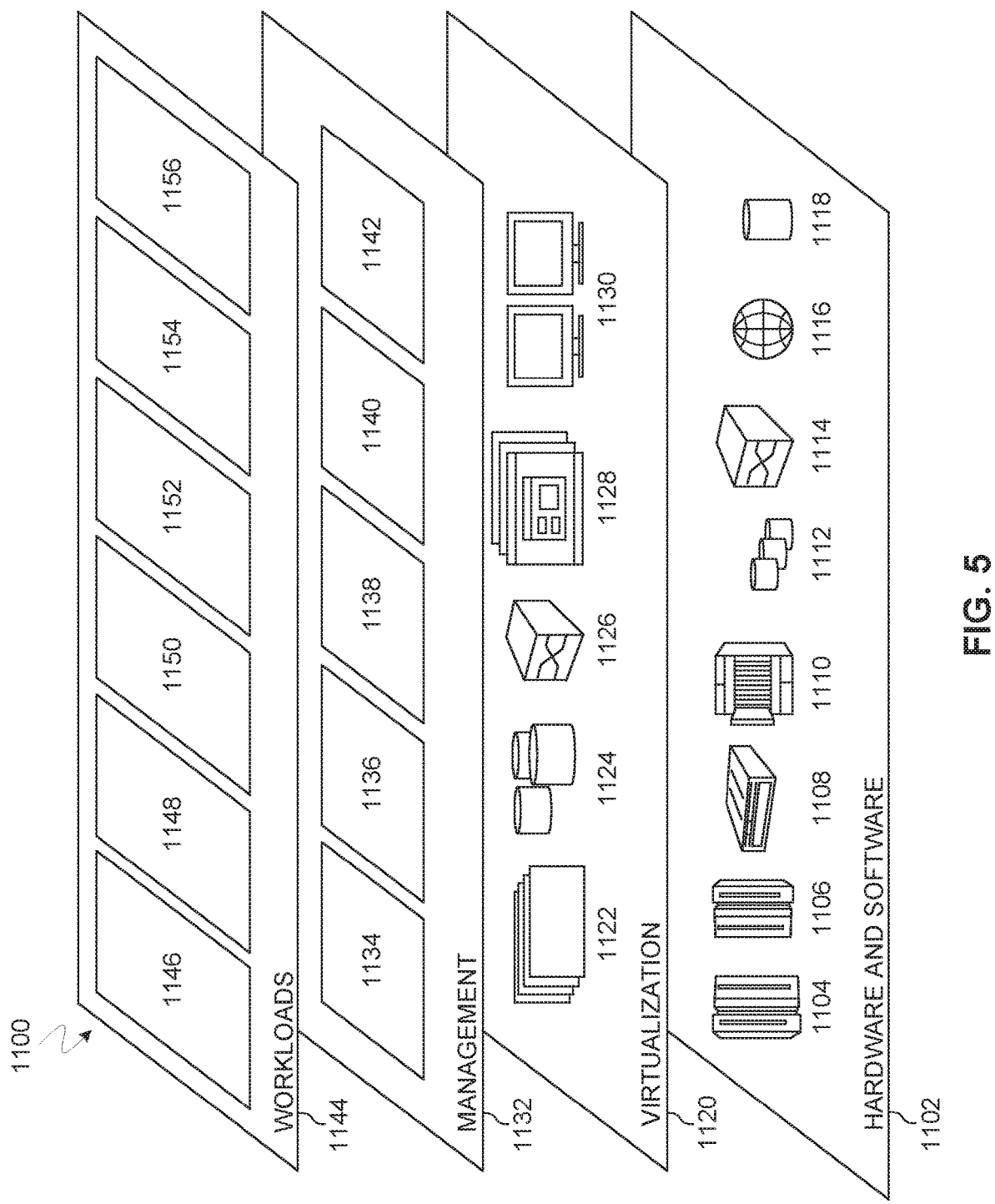
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and node synchronization 1156. A node synchronization program 110a, 110b provides a way to dynamically alter travel behavior or suggest alterations to travel behavior for one or more nodes to minimize wait time for nodes meeting at a destination at a predefined time.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for synchronizing a plurality of nodes to meet at a destination, the method comprising:
   receiving a synchronization request from a first node within the plurality of nodes for meeting at the destination;
   sending an invitee request to a second node within the plurality of nodes;
   receiving a plurality of node data and a plurality of constraints from the plurality of nodes;
   generating a plurality of valid corrective actions based on the received plurality of node data and the received plurality of constraints;
   determining a projected arrival time at the destination for each node within the plurality of nodes based on the received plurality of node data;
   determining at least one late node based on the projected arrival time of the at least one late node within the plurality of nodes exceeding a threshold acceptable time range;
   determining the at least one late node is associated with at least one node limitation, wherein the at least one node limitation indicates route changes corresponding with the at least one late node are impermissible;
   in response to determining the at least one late node is associated with the at least one node limitation, determining a plurality of corrective actions associated with an alterable node within the plurality of nodes based on the projected arrival time of the at least one late node and the generated plurality of valid corrective actions, wherein the alterable node is not associated with the at least one node limitation, wherein the determined plurality of corrective actions includes a speed change for a vehicle transporting the alterable node;
   sending the determined plurality of corrective actions to an electronic navigational device associated with the alterable node; and
   in response to the electronic navigational device receiving the determined plurality of corrective actions, altering a travel route to the destination presented by the electronic navigational device associated with the alterable node in accordance with the received plurality of corrective actions.

2. The method of claim 1, wherein the determined plurality of corrective actions results in a new projected arrival time that does not exceed the threshold acceptable time range.

3. The method of claim 1, further comprising:
   determining a weight for each constraint within the received plurality of constraints,
   wherein determining the plurality of corrective actions associated with the alterable node is also based on the determined weight for each constraint.

4. The method of claim 1, wherein the synchronization request includes a meeting location value, a meeting time value, and at least one invitee node within the plurality of nodes.

5. The method of claim 4, further comprising:
   determining that a current time does not exceed a time threshold based on the meeting time value; and
   receiving an additional plurality of node data and an additional plurality of constraints.

6. The method of claim 4, wherein determining the at least one late node based on the projected arrival time of the at least one late node within the plurality of nodes exceeding the threshold acceptable time range comprises determining a difference between the projected arrival time and the meeting time value and comparing the difference with the threshold acceptable time range.

7. A computer system for synchronizing a plurality of nodes to meet at a destination, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving a synchronization request from a first node within the plurality of nodes for meeting at the destination;

sending an invitee request to a second node within the plurality of nodes;

receiving a plurality of node data and a plurality of constraints from the plurality of nodes;

generating a plurality of valid corrective actions based on the received plurality of node data and the received plurality of constraints;

determining a projected arrival time at the destination for each node within the plurality of nodes based on the received plurality of node data;

determining at least one late node based on the projected arrival time of the at least one late node within the plurality of nodes exceeding a threshold acceptable time range;

determining the at least one late node is associated with at least one node limitation, wherein the at least one node limitation indicates route changes corresponding with the at least one late node are impermissible;

in response to determining the at least one late node is associated with the at least one node limitation, determining a plurality of corrective actions associated with an alterable node within the plurality of nodes based on the projected arrival time of the at least one late node and the generated plurality of valid corrective actions, wherein the alterable node is not associated with the at least one node limitation, wherein the determined plurality of corrective actions includes a speed change for a vehicle transporting the alterable node;

sending the determined plurality of corrective actions to an electronic navigational device associated with the alterable node; and in response to the electronic navigational device receiving the determined plurality of corrective actions, altering a travel route to the destination presented by the electronic navigational device associated with the alterable node in accordance with the received plurality of corrective actions.

8. The computer system of claim 7, wherein the determined plurality of corrective actions results in a new projected arrival time that does not exceed the threshold acceptable time range.

9. The computer system of claim 7, further comprising:
determining a weight for each constraint within the received plurality of constraints,
wherein determining the plurality of corrective actions associated with the alterable node is also based on the determined weight for each constraint.

10. The computer system of claim 7, wherein the synchronization request includes a meeting location value, a meeting time value, and at least one invitee node within the plurality of nodes.

11. The computer system of claim 10, further comprising:
determining that a current time does not exceed a time threshold based on the meeting time value; and
receiving an additional plurality of node data and an additional plurality of constraints.

12. The computer system of claim 10, wherein determining the at least one late node based on the projected arrival time of the at least one late node within the plurality of nodes exceeding the threshold acceptable time range comprises determining a difference between the projected arrival time and the meeting time value and comparing the difference with the threshold acceptable time range.

13. A computer program product for synchronizing a plurality of nodes to meet at a destination, comprising:
one or more tangible computer-readable storage medium and program instructions stored on at least one of the one or more tangible computer-readable storage medium, the program instructions executable by a processor, the program instructions comprising:
program instructions to receiving a synchronization request from a first node within the plurality of nodes for meeting at the destination;
program instructions to send an invitee request to a second node within the plurality of nodes;
program instructions to receive a plurality of node data and a plurality of constraints from the plurality of nodes;
program instructions to generate a plurality of valid corrective actions based on the received plurality of node data and the received plurality of constraints;
program instructions to determine a projected arrival time at the destination for each node within the plurality of nodes based on the received plurality of node data;
program instructions to determine at least one late node based on the projected arrival time of the at least one late node within the plurality of nodes exceeding a threshold acceptable time range;
determining the at least one late node is associated with at least one node limitation, wherein the at least one node limitation indicates route changes corresponding with the at least one late node are impermissible;
in response to determining the at least one late node is associated with the at least one node limitation, program instructions to determine a plurality of corrective actions associated with an alterable node within the plurality of nodes based on the projected arrival time of the at least one late node and the generated plurality of valid corrective actions, wherein the alterable node is not associated with the at least one node limitation, wherein the determined plurality of corrective actions includes a speed change for a vehicle transporting the alterable node;
program instructions to send the determined plurality of corrective actions to an electronic navigational device associated with the alterable node; and
in response to the electronic navigational device receiving the determined plurality of corrective actions, program instructions to alter a travel route to the destination presented by the electronic navigational device associated with the alterable node in accordance with the received plurality of corrective actions.

14. The computer program product of claim 13, wherein the determined plurality of corrective actions results in a new projected arrival time that does not exceed the threshold acceptable time range.

15. The computer program product of claim 13, further comprising:
program instructions to determine a weight for each constraint within the received plurality of constraints,
wherein determining the plurality of corrective actions associated with the alterable node is also based on the determined weight for each constraint.

16. The computer program product of claim 13, wherein the synchronization request includes a meeting location value, a meeting time value, and at least one invitee node within the plurality of nodes.

17. The computer program product of claim 16, further comprising:

program instructions to determine that a current time does not exceed a time threshold based on the meeting time value; and program instructions to receive an additional plurality of node data and an additional plurality of constraints.

* * * * *